Sept. 25, 1951      C. J. E. OMERON      2,569,252

CONTROL FOR ENCLOSED INTERNAL-COMBUSTION ENGINES

Filed Sept. 7, 1948      3 Sheets-Sheet 1

INVENTOR
CARL J. E. OMERON

BY

ATTORNEY

Sept. 25, 1951          C. J. E. OMERON          2,569,252
CONTROL FOR ENCLOSED INTERNAL-COMBUSTION ENGINES
Filed Sept. 7, 1948          3 Sheets-Sheet 2
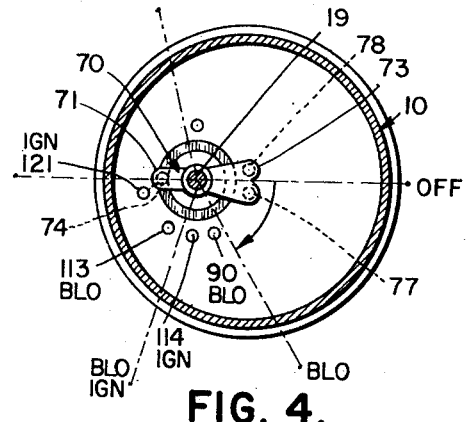
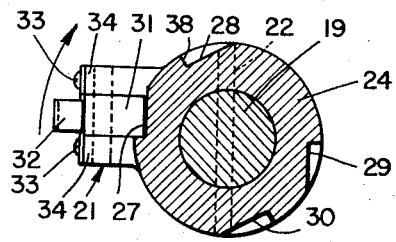
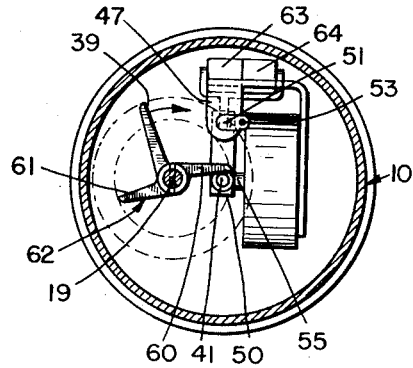
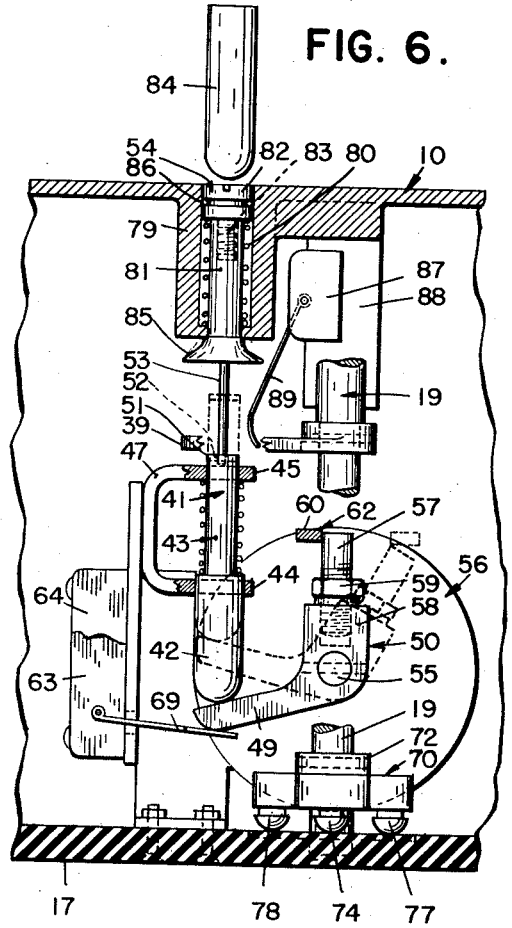
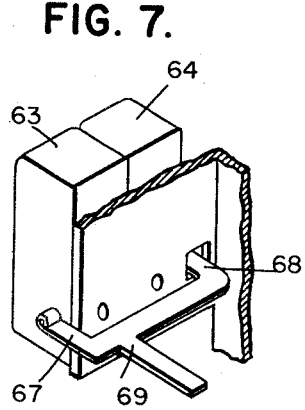
INVENTOR
CARL J. E. OMERON
BY
*Thomas Davies Saul*
ATTORNEY Sept. 25, 1951  C. J. E. OMERON  2,569,252
CONTROL FOR ENCLOSED INTERNAL-COMBUSTION ENGINES
Filed Sept. 7, 1948  3 Sheets-Sheet 3

INVENTOR
CARL J. E. OMERON
BY
ATTORNEY

Patented Sept. 25, 1951

2,569,252

UNITED STATES PATENT OFFICE 2,569,252

CONTROL FOR ENCLOSED INTERNAL-
COMBUSTION ENGINES

Carl J. E. Omeron, Los Angeles, Calif.

Application September 7, 1948, Serial No. 48,018

15 Claims. (Cl. 123—179)

The present invention relates to engine ignition control apparatus, and more particularly to an apparatus to control the energizing of an engine ignition circuit in predetermined timed relation to associated electrically controlled ventilation and safety apparatus.

In my co-pending application, Ser. No. 765,378, filed August 1, 1947, I have disclosed a timed engine ignition control apparatus for the same general purpose as my present invention.

An object of the present invention is to make an improved, time-regulated, engine safety control aparatus.

Another object is to control, in predetermined timed sequence, the operation of a plurality of electrical circuits associated with the operation of an internal combustion engine.

Another object is to control the timed sequence of operation of a plurality of electrical circuits, for controlling the operation of an internal combustion engine, emergency release means being provided for dispensing with a stage of said sequence.

Another object is to make a time controlled engine ignition and ventilating blower control apparatus operating in a predetermined cycle, and having associated signals to indicate various stages of the cycle of operation thereof.

Another object is to make an engine safety and ventilating blower control apparatus wherein a control mechanism is arranged to operate in a predetermined cycle through successive stages of a time-controlled sequence of operations, and to return to an inoperative starting point by a continuous step-by-step operation of a control member, without reversing the direction of movement of the control member.

Another object is to make an engine ignition and ventilating blower control apparatus with a switch control shaft mounted to have a plurality of successive operative positions and at least one non-operative position, the shaft having step-by-step controlled relation with timing mechanism associated therewith.

Another object is to make an engine ignition and ventilating blower control with a post-operational feature for operating a ventilating blower system for a predetermined length of time after the internal combustion engine which the device controls has been shut down.

In order to attain these objects, there is provided, in accordance with one feature of the invention, a control shaft mounted in a hermetically sealed housing with means for rotating the control shaft in one direction in step-by-step operations through a continuously repeating cycle, the shaft having a plurality of actuating elements secured thereto and being adapted to operate timed control mechanism, including stops and circuit control mechanisms at various stages in its step-by-step cycle of operation.

These and other features and advantages of the invention will be brought out more fully in the following description and the accompanying drawings, wherein:

Fig. 3 is a sectional view taken on the offset planes of the broken line 3—3 of Fig. 2, but to the same scale as Fig. 1;

Fig. 4 is a sectional view to the same scale as Fig. 3 taken in the plane of the line 4—4 of Fig. 2;

Fig. 5 is an enlarged fragmentary sectional view taken in the plane of the line 5—5 of Fig. 2;

Fig. 6 is a fragmentary sectional view taken in the plane of the line 6—6 of Fig. 1, but to the same scale as Fig. 2, parts being broken away to disclose structure which otherwise would be concealed thereby;

Fig. 7 is a fragmentary view in perspective showing a pair of control switches yoked together for operation by a single control lever;

Figure 1:
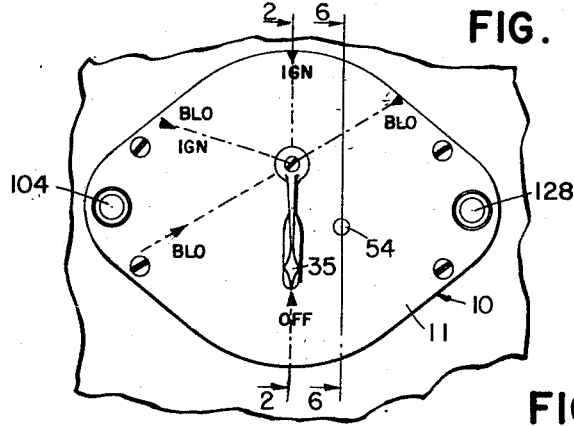
Fig. 1 is a plan view of the control device as it appears when mounted, for example, in the instrument control panel of a motor boat.

In the drawings, the principal control operational mechanisms of the invention are mounted in a cup-shaped housing 10 which may be of cast metal such as bronze. The housing has a laterally extending mounting flange 11 adapted to overlie the marginal area around an opening 12 in an instrument panel or other suitable support member. Mounting studs 13 are secured to the inner face of the mounting flange 11 to project inwardly therefrom. These studs are of a length to pass through the mounting panel and through a mounting ring 14 which may be mounted on the inner side of the mounting panel around the opening 12 therein. The housing 10 is secured in position by nuts 15 threaded onto the mounting studs to grip the mounting panel between the mounting flange and the ring.

Figure 2:
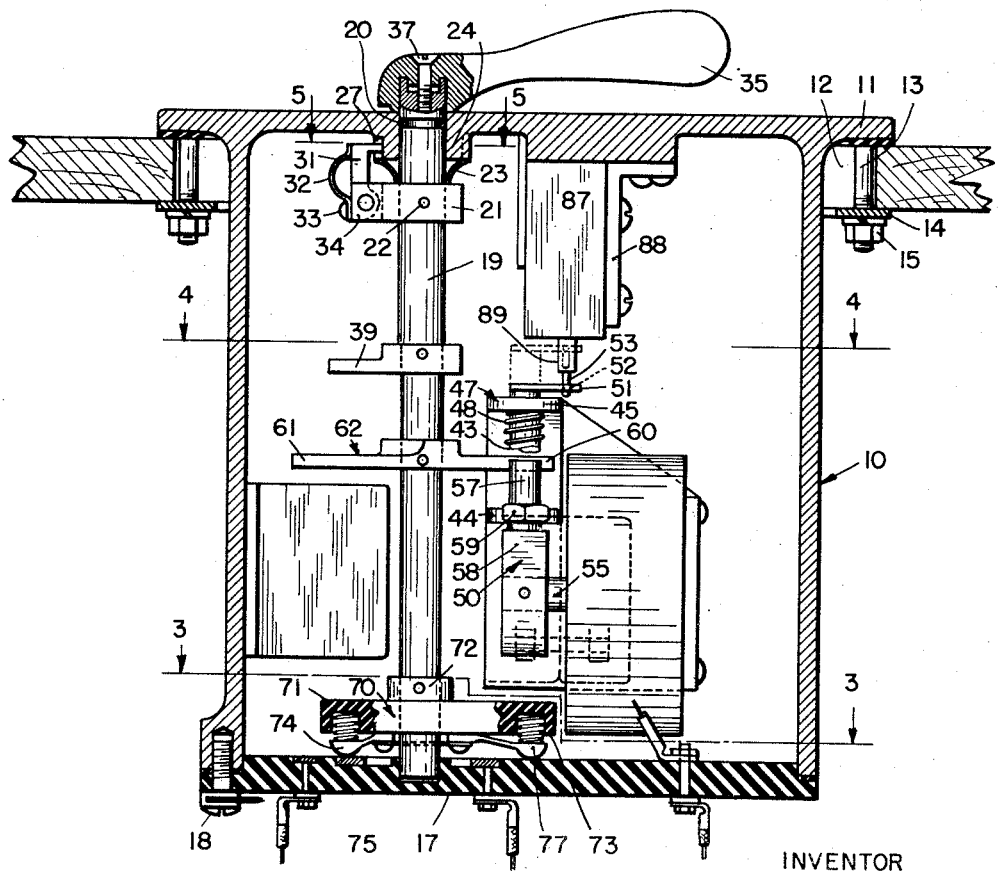
Fig. 2 is an enlarged sectional view taken in the plane of the line 2—2 of Fig. 1, the lower portion of a time-controlled stop member and portions of an operating handle and a switch arm being broken away to show structural features.

The open inner end of the housing 10 is provided with a closure plate 17 which preferably is of strong insulative material such as hard rubber or plastic of the ureaformaldehyde type. This closure plate is held in hermetically sealed relation to the inner open end of the housing 10 as by screws 18 which are threaded into holes in the housing. A control shaft 19, of any suitable material such as bronze, has its upper end pivotally mounted in an opening in the closed outer end of the housing 10, and its lower end (as illustrated in Figs. 2 and 4) mounted rotatably in a recess in the closure plate 17. A water-tight seal is provided around the upper end of the shaft as illustrated in Fig. 2 as by means of a hydraulic sealing ring 20 which may be of rubber or synthetic.

A pawl supporting collar 21 is secured to the control shaft 19 near its upper end as by means of a through pin 22. A spring thrust ring 23, having a cross sectional shape as indicated in Fig. 2, is mounted in axial compression between the upper surface of the pawl supporting collar 21 and a ratchet boss 24, which extends downwardly from the top of the housing 10 around the opening for the control shaft 19 therein. This thrust ring retains the control shaft against upward displacement in the housing. The peripheral face of the boss 24 has a plurality of ratchet notches 27, 28, 29 and 30 cut therein, as shown in Fig. 5 to receive a spring pressed pawl lever 31 therein in each of a plurality of adjusted positions thereof. The pawl lever 31 is pivoted between a pair of laterally extending projections 34 on the collar 21, and the upper end or nose portion of the pawl is urged radially inwardly toward the ratchet recesses in the ratchet-cut boss 24 by a leaf spring 32. This leaf spring is secured as by screws 33 to the outer end of the pair of projections 34. As the control shaft 19 is turned from one adjusted position to the next, each of the notches in the ratchet boss 24 receives the pawl lever 31 with a perceptible click, which indicates the arrival, at each successive stage of operation, of an operating handle 35, which has keyed, endwise engagement with the control shaft 19 and is secured thereon as by a screw 37. By being provided with a radially disposed face, such as the face 38, on the counter-rotational side of each ratchet notch, counter rotation of the operating or control handle 35 from an operating position, as determined by the location of each notch, is prevented. The other end of the flat bottom face of each such ratchet notch, however, extends to the periphery of the ratchet boss, so that the pawl lever 31 is free to cam out of each notch on rotation of the operating lever in the proper direction toward the next successive stage in its cycle of operation.

The successive stages of operation of the device, as determined by the position of the control handle 35, are illustrated in the accompanying drawings. Each position of the control handle in its cycle of operation preferably is marked by indicia on the top of the housing 10. These positions are as follows: "Off" which is self-explanatory; "Blo" in which a circuit is completed to an electrically energized compartment ventilating blower for a predetermined length of time, for example 5 minutes; "Blo-Ign" wherein the ignition circuit to the engine is closed, in addition to that for the blower, and in which position the engine may be started; "Ign," where only the ignition circuit is energized. "Auto-Blo" is not a stop position of the control handle, but is the point at which the electrically energized compartment ventilating blower again is energized for a predetermined time interval after turning the control handle from "Ign" to "Off."

A stop lever 39 for arresting the rotation of the control shaft short of an ignition closing position, has a hub portion with a hole therein to receive the control shaft 19 closely therein. The stop lever 39 is secured to the control shaft in adjusted position as by a through pin 40. The stop lever is of a length to engage, and to be arrested from further rotation by, a stop pin 41 (see Figs. 2, 4 and 6) when this stop pin is moved upwardly to a timed arresting position in a manner to be described later herein.

The stop pin 41, see particularly Fig. 6, has a cylindrical lower portion 42 and an upper portion 43 of reduced diameter. The stop pin is mounted for vertical sliding movement in holes of corresponding diameters in the lower and upper arms, 44 and 45 respectively, of a transversely positioned U-shaped mounting bracket 47. A coil spring 48 surrounds the reduced upper portion of the stop pin, and is held in compression between the marginal area of the upper bracket arm around the stop pin receiving hole therein, and the offset shoulder on the stop pin between the reduced upper and larger lower portions thereof. The action of the coil spring 48, in addition to the weight of the stop pin, urges the pin downwardly into contact with an arm 49 of a clockwise connected bell crank timing lever 50.

A laterally projecting arm 51, which may be of sheet metal, is secured to the upper end of the stop pin to move vertically therewith. The outer end of this arm 51 has a hole 52 therein to receive and guide a pin 53 which extends axially downward from the lower end of an emergency release button 54 which will be described later herein.

The bell crank timing lever 50 is mounted on the end of a shaft 55 by a through pin. The shaft 55 is operatively connected to the spring or electrically energized mechanism 56 of a usual periodic timing device, wherein the clockworks shaft is connected to the clockworks mechanism through a usual friction clutch which permits reversal of the shaft and an unwinding of the clockworks or opening of the circuit if electrically operated in a usual manner for such timing devices. For the purpose of the present description it will be assumed that the clockworks is mechanical. The clockworks is wound and started in operation by a rotational movement of the bell crank timing lever 50 in a clockwise direction from the solid, toward the dotted, line positions of Fig. 5. A self-contained limit stop of a usual sort in the timing mechanism itself prevents counterclockwise rotation of the bell crank lever 50 beyond the solid line position of Fig. 6. In the unwound condition of the timing mechanism indicated in solid lines in Fig. 6, the stop pin 41 will be in its lowermost position, being urged downwardly by the coil compression spring 48. In the wound condition of the clockworks the parts will be in the dotted line positions of Fig. 6, with the stop pin 41 raised to a position to intercept the stop lever 39 on the control shaft 19.

A time interval control cocking pin 57 is threaded into the end of an arm 58 of the bell crank lever 50 to extend upwardly beyond the end thereof. It is secured in axially adjusted position in the arm 58 as by a lock nut 59. This cocking pin 57 in the unwound condition of the clockworks, is positioned to be engaged successively by each of a pair of substantially radially oppositely projecting arms 60 and 61 of a cocking lever 62, secured to the control shaft 19 by a through pin. One of these arms 60 is mounted so as to be laterally adjacent the cocking pin 57 when the control handle 35 is in the "Off" position as illustrated in Figs. 2, 4 and 6. The other arm 61 is positioned to engage the cocking pin 57, and through it operates the bell crank timing lever 50, when the control handle is moved from "Ign" or running position to the "Off" position of Fig. 2. Thus at two stages in each complete cycle of rotation of the manual control handle 35, the clockworks mechanism is placed in operation by the action of the arms 60 and 61. In each case the stop pin 41 is moved upwardly into the path of the stop lever 39.

A complete cycle of operation of the control handle 35 is as follows: In moving the control handle 35 from "Off" to the "Blo" position of Fig. 3, the stop pin is raised as above set forth by the action of the cocking lever arm 60 against the cocking pin 57 on the bell crank lever 50. This raises the stop pin into the path of movement of the stop lever 39 on the control shaft 19. This arrests further rotation of the control shaft until the clockworks reversely moves the bell crank lever 50 sufficiently to lower the stop pin out of the path of the stop lever 39. When this occurs the control handle 35 is freed to swing in a clockwise direction as shown in Fig. 1 past the stop pin. Preferably the control handle then is swung to the next successive or "Blo-Ign" position of Fig. 1 which, as previously mentioned, is the position for starting the engine. It is left in this "Blo-Ign" position until the engine is started and has attained a proper running condition. Since it is usual for boat engines to operate their own compartment ventilating apparatus the need for the auxiliary electrical ventilating apparatus ends when the engines starts. The control handle 35 then may be swung to the "Ign" position.

A pair of switches 63 and 64 are mounted on the rear of the bracket 47, as shown in Figs. 6 and 7, and their operating arms 67 and 68 are yoked together as shown at 69 in Fig. 7. The single switch operating arm thus formed is mounted beneath the arm 49 of the bell crank lever 50 to be operated thereby when the bell crank lever approaches its unwound or stop pin releasing position indicated in solid lines in Fig. 6. The switch 63 is of the normally open type while the other, 64, is of the normally closed type.

The operation of these switches, and of other electrical parts of the apparatus, will be disclosed later herein in a description of the electrical circuits involved.

A switch arm 70 of insulative material, such as hard rubber or plastic, is mounted on, and adjacent, the lower end of the control shaft 19 as by a through pin. This switch arm, best shown in Figs. 2 and 3 has a short portion 71 extending radially from one side of a hub 72, and a bifurcated longer portion 73 extending from the other side of the hub. The shorter portion 71 has a spring pressed contact point 74 mounted on the lower side thereof and having spring pressed contact with a wipe ring 75 of electrically conductive material such as copper, embedded in the insulative closure plate 17. This wipe ring is adapted to be connected to a common ground connection of the various circuits controlled by this switch.

The bifurcated longer portion 73 has a pair of contact points 77 and 78 mounted one in each bifurcated portion thereof. These contact members 77 and 78 are positioned to contact respectively, a plurality of electrically conductive contact point such as the point 76 in Fig. 2 as the control handle 35 swings the control shaft through each of its successive positions in its cycle of operation.

In order to permit emergency operation of the boat engine where necessary without waiting for the elapse of the usual predetermined time interval, the emergency releasing pin or button 54 is provided. This button is mounted slidably in a hole axially through an elongated boss 79 which projects downwardly from the lower face of the upper closed end of the housing 10. The lower end of the hole is of reduced diameter as shown in Fig. 6 and supports a coil spring 80 which surrounds a reduced portion 81 of the button 54 and is held in compression against the under side of an enlarged head portion 82. This head portion for structural purposes is a separate element provided with a threaded shank 83, which is screwed into a threaded opening axially of the upper end of the member 54. A sealing ring 86 is mounted in a groove peripherally of the head 83. The top of the head 83 as illustrated in Fig. 6 in a normally raised position of the emergency release button is flush with the top of the housing 10. With this construction, it is impossible to operate the emergency release button with the hands alone, and requires the use of an auxiliary instrument, such as a pin 84, which may be kept conveniently handy to the control assembly and may, if desired, be mounted in a manner common with fire extinguishers and emergency equipment, in a usual glass faced box which requires breaking of the glass in order to secure the emergency operating pin. The lower end of the emergency release button 54 is flared outwardly as at 85 in Fig. 6 and as previously mentioned herein has an elongated guide pin extension 53 which is inserted in a hole in the laterally extending top portion 51 of the stop pin 41.

A normally open emergency control switch 87 is mounted on a bracket 88 laterally adjacent the emergency stop button 54. The operating arm 89 of the switch 87 is positioned to be engaged by the flared lower end portion 85 of the body 81 of the emergency release button when it is moved to the emergency release position illustrated in Fig. 8 to close the switch 87.

Figure 9:
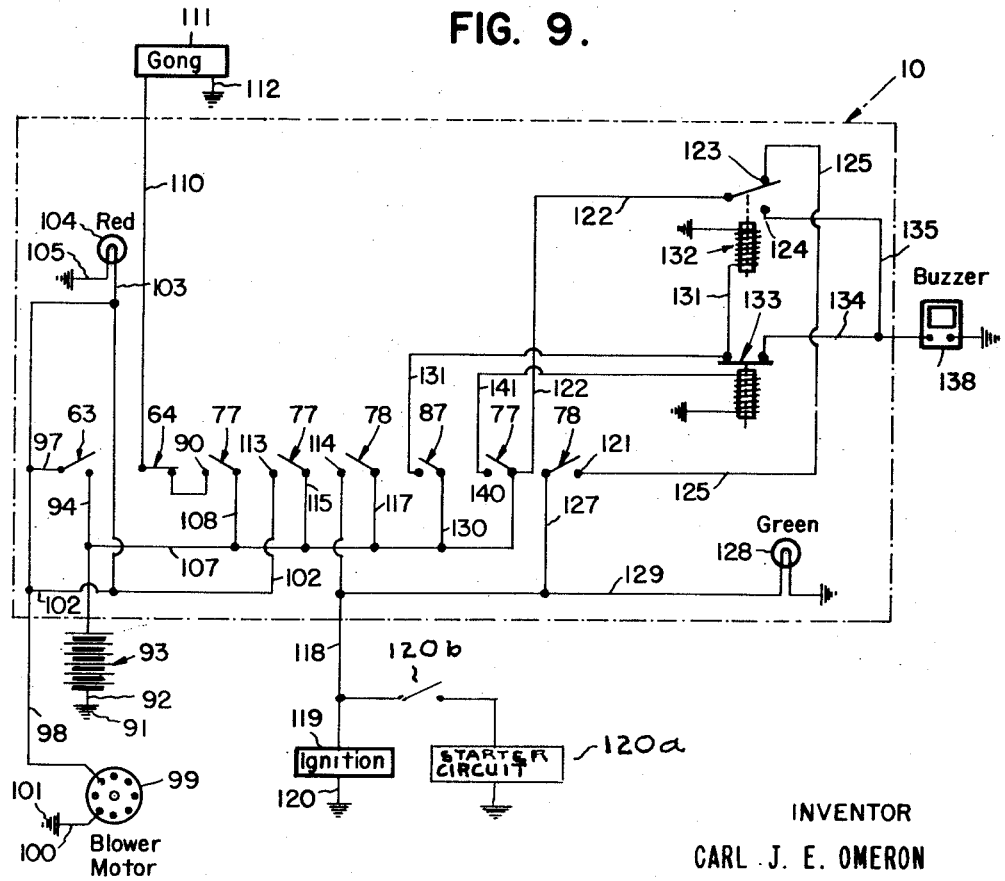
Fig. 9 is a schematic circuit diagram of a control circuit operated by the device.

A diagrammatic wiring arrangement for the control mechanism is illustrated in Fig. 9. This wiring arrangement will be brought out in a description of the operation of the control mechanism in each of the various operative positions of the control handle throughout one complete normal cycle of operation. The operation of the emergency release arrangement will be described thereafter.

Assuming that the control handle 35 is in the "Off" position and it is desired to start the engine in the intended usual manner; the control handle 35 will be moved first in a clockwise direction from the "Off" position illustrated in Fig. 1 to the "Blo" position indicated in dotted line in Fig. 1. When the operating handle arrives at this "Blo" position, the pawl lever 31 will be forced by the spring 32 into the first ratchet notch 28 beyond the "Off" position notch 27 (see Fig. 5) with an audible click. This also may be felt through the hand of the operator.

During this initial movement of the operating handle, the stop 41 is moved upwardly from the solid to the dotted line arresting position of Fig. 6. In this position it is engaged by the stop lever 39 secured to the control shaft 19 to arrest its rotation. The clockworks 56 is wound during this initial movement of the operating handle by the clockwise rotation of the bell crank time lever 50 from the solid to the dotted line position of Fig. 6, as previously described herein. As the bell crank lever 50 moves from the solid line position to the dotted line position of Fig. 6, the normally closed switch 64 will be opened, and the normally open switch 63 will be closed. Also this initial stage of rotation of the control shaft 19 swings the control switch arm 70 on the lower end thereof to bring the contact point 77 on one of the bifurcated ends thereof into contact with a switch contact 90, see Fig. 3.

Referring now to the circuit diagram of Fig. 9, the closing of the switch 63 closes a circuit from ground at 91 through a conductor 92, a battery 93, a conductor 94, the switch 63, conductors 97 and 98, an electrically energized compartment venting motor-blower 99, and a conductor 100 to the common ground at 101. Simultaneuosly with the energizing of the motor-blower 99, a circuit also is completed from the conductor 98 between the switch 63 and the motor-blower, through conductors 102 and 103, a red warning light 104 and a conductor 105 to ground. At the expiration of the timed period for which the clockworks is adjusted, the switch 63 will be opened and the switch 64 will be closed by the return to normal position of the arm 49 of the bell crank lever 50. This causes the arm 49 to engage the yoked arm 69 and restore the switches 63 and 64 to their normal conditions. When this occurs, the switch point 77 being in contact with the contact point 90 of the control switch arm 70, a circuit will be completed from the conductor 92, the battery 93, the conductor 94, and conductors 107 and 108, through the closed switch contact 78 and contact point 90, a conductor 109, the normally closed switch 64, a conductor 110, a one stroke gong 111 and a conductor 112 to ground.

Since the return of the clockworks-actuated bell crank lever 50 to normal also will return the stop pin 41 to its solid line inoperative position of Fig. 6, the stroke of the gong indicates that the mechanism is cleared for advancing beyond this first operative position. For starting the engine the control handle then preferably should be swung to the "Blo-Ign" position. In this position the switch point 77 contacts a point 113, and switch point 78 contacts a point 114, see Fig. 3. The blower, which was de-energized by the opening of the switch 63, will again be energized through the switch contact 77 and the contact point 113 by a circuit from ground through the conductor 92, the battery 93, the conductors 94 and 107, a conductor 115, the switch contact 77 and contact point 113 and the conductors 102 and 98 through the motor blower 99 to ground. The red light 104 also will be energized on the closing of the switch contact 77 and contact point 113, the circuit being from battery 93, through conductors 94, 107 and 115, contacts 77 and 113, conductors 102, 98 and 103 and thence through the red light 104 to ground.

Closing of the switch contact 78 and contact point 114 completes a circuit from ground through the battery 93, the conductors 94 and 107, a conductor 117, the ignition switch contact 78 and ignition point 114, a conductor 118, the engine ignition system 119, and a conductor 120 to ground. The usual engine starter circuit 120a is connected in parallel with the ignition system through a manually controlled starter switch 120b so that whenever the ignition system is energized the engine can be started. Closing of this circuit also completes the previously described circuit from the conductor 118 through the green light 128 to ground. This green light may be mounted similarly to the red light 104, preferably on the opposite side of the housing 10 from the red light.

After the engine is started and it no longer is necessary or desirable to continue the operation of the electrically energized motor blower 99, the operating handle is turned to the "Ign" or normal running position. In this position of the operating handle, the switch contact 78 is in contact with a contact point 121. Closing of this switch contact completes an ignition circuit from ground through the battery 93, the conductors 94 and 107, a conductor 122, through a normally closed contact 123 of a solenoid operated switch 124 which normally is in the solid line position of Fig. 9, thence through a conductor 125, the switch contact 78 and contact point 121 and thence through a conductor 127 and conductors 129 and 118 and the ignition system 119 to ground. This circuit also, it will be noted, energizes the conductor 129 and thereby the green light 128.

When it is desired to shut off the engine, the control handle 35 will be swung, still in a clockwise direction to the "Off" position, as illustrated in Fig. 1. During this rotative movement from the "Ign" to the "Off" position, the second shorter lever arm 61 of the double arm member 62 will engage the cocking pin 57 and swing the clockworks actuating bell crank lever 50 to the cocked position indicated by dotted lines in Fig. 5. This closes the switch 63 and operates the blower and energizes the red light 104 as previously described for the predetermined time interval. During this time, of course, the stop pin 42 will be in its raised position, but will have no function unless it were attempted to turn the operating handle beyond the "Blo" position in a new cycle of operation. Normally this would not occur, and the blower will simply operate for the predetermined time interval after which the switch 63 will be opened to de-energize the blower and the red light.

Figure 8:
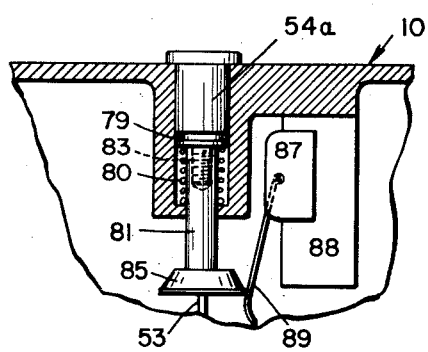
Fig. 8 is a fragmentary sectional view of an emergency release button in an operated condition, the button being modified slightly from Fig. 6 where the button is shown in normal condition.

In the event that it becomes necessary, through the arising of an emergency, to start the engine without waiting for the elapse of the predetermined time interval with the electrically energized blower operating, the emergency release pin 54 may be pressed inward to the position illustrated in Fig. 8. With the flush type button illustrated in Fig. 6 this will require the use of some suitable instrument such as the operating pin 84. This closes the switch 88, as previously set forth, and completes a circuit through the coil of the solenoid actuated switch 124 of Fig. 9. This circuit is from ground through the battery 93, the conductors 94 and 107, a conductor 130, the switch 87, a conductor 131, the solenoid coil 132, and thence to ground. This swings the solenoid switch 123 to the actuated dotted line position in Fig. 9 which completes a holding circuit for the solenoid actuated switch from ground through the coil 132 of the solenoid switch, the conductor 131, a normally closed second solenoid actuated switch 133, a conductor 134, a conductor 135, across the main solenoid switch contact arm 123 in its dotted line position, and thence through the conductors 122, 107 and 94 and battery 93 to ground. This closing of the holding circuit for the solenoid switch also completes a circuit through a conductor 137 and a warning signal 138 to ground. This warning signal may be continuously operating buzzer or other suitable device. The pressing down of the emergency release pin 54 to the actuated position of Fig. 8, in addition to closing the switch 87, also unwound the clock mechanism and restored the stop pin 41 to its normal solid line position of Fig. 6. This freed the operating handle 35 for rotation beyond the "Blo" position. It will be noted in Fig. 9 that the moving of the solenoid actuated switch to its dotted line actuated position opens the circuit through the "Ign" switch contact 78 and contact point 121 and conductor 125 as previously described so that it is thus not possible to run with the control handle in the "Ign" position on emergency release. The operating handle 35 therefore must be turned to the "Blo-Ign" position for operation in the emergency release condition when the solenoid switch 124 is actuated. The circuit through the "Blo-Ign" position switch contacts 77 and 78 and contact points 113 and 114 remain as previously described however including the energizing of the red light 104. Therefore, by moving the control handle to the "Blo-Ign" position, the blower and ignition will be energized. The single stroke of the gong 111 also will sound as the control handle 35 is moved to the "Blo-Ign" position after operating the emergency release button since the switch 84 will be moved to its normally closed position on the unwinding movement of the bell crank lever 50 and the control handle will, at the time of operating the emergency release button, be in the "Blo" position.

It is not desired that continuing operation be maintained after an emergency release start and, for that reason, the warning signal 138, in this case a buzzer, will continue to operate continuously after such an emergency start. When the boat has been brought to a safe condition after such an emergency start, it is recommended that the engine be shut off as previously described and a normal start with usual waiting period be made.

As the operating handle is swung from either the "Blo-Ign" or "Ign" positions to the "Off" position, the switch contact 77 will contact a switch point 140. As shown in Fig. 9, the closing of this contact will complete a circuit from the battery 93 through the conductors 94 and 107, the switch contact 77 and contact point 140, a conductor 141 and the coil of the second solenoid actuated switch 133 to ground. This opens the second solenoid switch 133 thereby opening the holding circuit to the coil of the first solenoid switch 124 which permits the first solenoid switch to return to its normal solid line position. This also opens the holding circuit to the coil of the first solenoid switch through its own contact arm 123 after the second solenoid switch 133 returns to its normal closed condition, and opens the circuit through the warning signal 138.

The device comprises a control arrangement for internal combustion engines in enclosed compartments particularly as they are mounted in boats and one which is capable of emergency operation in case of an emergency; however, the arrangement for emergency operation is such as to preclude the use of the emergency procedure except in cases of emergency. While I have illustrated and described a preferred form of my invention, it will be apparent to those familiar with the art that this device is capable of modification without departing from the spirit of the invention. It is desired, therefore, not to limit the invention except as set forth in the following claims.

I claim:

1. A device for controlling the operation of an internal combustion engine mounted in a compartment requiring ventilation, said engine having an electrically energized starter-ignition circuit and an electrically energized compartment ventilating circuit and a source of electrical energy, said device comprising: switch means mounted electrically to connect said ventilating circuit to said source of electrical energy in one position of said switch means, and to connect said starter-ignition circuit to said source in a second position of said switch means; said switch means having an "off" position intermediately of said second position and said one position; stop means mounted to arrest the movement of the switch means at said one position from said "off" position; and time control means actuated by an operation of the switch means from the "off" to the one position, said time control means being mounted to move the stop means from arresting condition on the passing of a predetermined time interval thereafter.

2. A device for controlling the operation of an internal combustion engine mounted in a compartment requiring ventilation, said engine having an electrically energized starter ignition circuit and an electrically energized compartment ventilating circuit and a source of electrical energy, said device comprising: a sealed housing; control switch means rotatably mounted in said housing; a shaft operatively connected to said switch means and manually operable exteriorly of said housing, means for limiting rotative movement of the shaft to a single direction; said switch being adapted electrically to connect said ventilating circuit to said source of electrical energy in one position of said switch means, and to connect said starter ignition circuit to said source in a second position of said switch means; said switch means having an "off" position between said second position and said one position; stop means mounted to arrest the movement of the switch means at said one position from said off position; and time control means actuated on a movement of the switch means from the "off" to the one position, said time control means being mounted to move the stop means from arresting condition on the passing of a predetermined time interval thereafter.

3. A device for controlling the operation of an internal combustion engine mounted in a compartment requiring ventilation, said engine having an electrically energized starter ignition circuit and an electrically energized compartment ventilating circuit and a source of electrical energy, said device comprising: a housing having an insulative closure plate on an end thereof; a control shaft rotatably mounted in said housing; means for limiting rotative movement of the shaft to a single direction; a switch member mounted on the shaft to rotate therewith adjacent said closure plate; switch means mounted on said housing and adapted to cooperate with said shaft mounted switch member electrically to connect said ventilating circuit to said source of electrical energy in one position of said shaft, and to connect said starter ignition circuit to said source in a second position of said shaft; said switch member having an "off" position between said second position and said one position of said switch member; stop means mounted to arrest the movement of the switch member at said one position from said "off" position; and time control means actuated on a movement of the switch member from the "off" to the one position, said time control means being mounted to move the stop means from arresting conditions upon the passing of a predetermined time interval thereafter.

4. A device for controlling the operation of an internal combustion engine mounted in a compartment requiring ventilation, said engine having an electrically energized starter-ignition circuit and an electrically energized compartment ventilating circuit, said device comprising: rotatable switch means having an "off" position, a compartment ventilating circuit energizing position, and an ignition energizing position; means for limiting the direction of rotation of the switch means to one, to assume the three positions in the above sequence; and time control stop means mounted to arrest the switch member in the ventilating energizing position for a predetermined time interval after being moved thereto from the "off" position.

5. A device for controlling the operation of an internal combustion engine mounted in a compartment requiring ventilation, said engine having an electrically energized ignition circuit and an electrically energized compartment ventilating circuit, said device comprising: a switch base; a switch member rotatably mounted thereon, and having an "off" position, a compartment ventilating circuit energizing position, and an ignition circuit energizing position; means for limiting the direction of rotation of the switch member to one, to assume the three positions in the above sequence; and time control stop means mounted to arrest the switch member in the ventilating energizing position and to prevent said switch member from moving therefrom to the ignition energizing position for a predetermined time interval after being moved from the "off" position.

6. A device for controlling the operation of an internal combustion engine mounted in a compartment requiring ventilation, said engine having an electrically energized starter-ignition circuit and an electrically energized compartment ventilating circuit, said device comprising: a switch base; rotatable switch means having an "off" position, a compartment ventilating circuit energizing position, and an ignition energizing position; time control stop means mounted normally to arrest the switch member in the ventilating energizing position for a predetermined time interval after being moved thereto from the "off" position, and emergency release means mounted to remove the stop means from arresting condition upon actuation of said emergency release means.

7. A device for controlling the operation of an internal combustion engine mounted in a compartment requiring ventilation, and having electrically energized compartment ventilating means, and electrically controlled engine ignition means; said device comprising a switch having an "off" position, a compartment ventilating means energizing position, and an engine ignition means energizing position, a cockable time control mechanism, a stop element mounted to be actuated by a cocking of the time control mechanism, means mounted on said switch to cock the time control mechanism on a movement of the switch from "off" position to compartment ventilating means energizing position thereof, and arresting means carried by the switch to engage and be arrested by the stop element at the latter position thereof for a predetermined period of operation of the time control means.

8. A device for controlling the operation of an internal combustion engine mounted in a compartment requiring ventilation, and having electrically energized compartment ventilating means, and electrically controlled engine ignition means; said device comprising a rotatable switch having an "off" position, a compartment ventilating means actuating position and an engine ignition means actuating position, a cockable time control mechanism, a stop element mounted to be actuated by a cocking movement of the time control mechanism, means mounted on said switch to cock the time control mechanism on a movement of the switch from "off" position to compartment ventilating means actuating position thereof, arresting means mounted on the switch to engage and be arrested by the stop element at the latter position thereof for a predetermined period of operation of the time control means, and an emergency release member mounted beyond the path of movement of the arresting means, said emergency release means being operable to uncock the time control mechanism and remove the stop element from the path of the arresting means.

9. A device for controlling the operation of an internal combustion engine mounted in a compartment requiring ventilation, with electrically energized compartment ventilating means, and electrically controlled engine ignition means, a switch having an "off" position, a compartment ventilating means actuating position and engine ignition means actuating position, a cockable time control mechanism, switch means mounted to be actuated by a cocking of said time control mechanism, said switch means being adapted to actuate said compartment ventilating means, a stop element mounted to be actuated by a cocking movement of the time control mechanism, means mounted on said switch to cock the time control mechanism on a movement of the switch from "off" position to compartment ventilating means actuating position thereof, and arresting means mounted on the switch to engage and be arrested by the stop element at the latter position thereof for a predetermined period of operation of the time control means.

10. A device for controlling the operation of an internal combustion engine mounted in a compartment requiring ventilation and having electrically energized compartment ventilating means, and electrically controlled engine ignition means; said device comprising a switch having a housing, a rotatable switch shaft pivoted in said housing switch means carried by said shaft and having successively an "off," a compartment ventilating means actuating and an engine ignition energizing position, a timing mechanism having a cocked and a normal inoperative position, a stop pin operatively associated with said timing mechanism, normally to be out of arresting position and to be moved to an arresting position by a cocking of the timing mechanism, and an arresting member secured to the switch shaft to engage said stop pin and arrest rotation of the switch shaft in the compartment ventilating means actuating position of said switch means.

11. A device for controlling the operation of an internal combustion engine mounted in a compartment requiring ventilation and having electrically energized compartment ventilating means, and electrically controlled engine ignition means; said device comprising a switch having a housing, a rotatable switch shaft pivoted in said housing, said shaft having successively an "off," a compartment ventilating means actuating and an engine ignition energizing position, a timing mechanism having a cocked and a normal inoperative position, a stop pin operatively associated with said timing mechanism, normally to be out of arresting position and to be moved to an arresting position by a cocking of the timing mechanism, an arm secured to said shaft and adapted to engage an element of said cocking mechanism to cock it upon a movement of the switch shaft from "off" to compartment ventilating means actuating position, an arresting member secured to the switch shaft to arrest rotation of the switch shaft in the compartment ventilating means actuating position of said switch means, and switch means mounted to be actuated by a cocking of the timing mechanism said latter switch means being adapted upon actuation thereof to energize the compartment ventilating means for a predetermined time interval.

12. The mechanism set forth in claim 11, and a second arm secured to said switch shaft and adapted to recock the timing mechanism upon a movement of the switch shaft from ignition to "off" position.

13. A device for controlling the operation of an internal combustion engine mounted in a compartment requiring ventilation, said engine having an electrically energized starter-ignition circuit and an electrically energized compartment ventilating circuit and a source of electrical energy, said device comprising switch means mounted electrically to connect said ventilating circuit to said source of electrical energy in one position of the switch means, and to connect said starter-ignition circuit to said source in a second position of the switch means, time controlled stop means mounted to prevent movement of the switch means from said one position to said second position for a predetermined time interval after electrically connecting said ventilating circuit, and an emergency release operable during such time interval to release said stop means to permit said switch to be moved to said second position.

14. A device for controlling the operation of an internal combustion engine mounted in a compartment requiring ventilation, said engine having an electrically energized starter-ignition circuit and an electrically energized compartment ventilating circuit and a source of electrical energy, said device comprising switch means mounted electrically to connect said ventilating circuit to said source of electrical energy in one position of the switch means, and to connect said starter-ignition circuit to said source in a second position of the switch means, time controlled stop means mounted to prevent movement of the switch means from said one position to said second position for a predetermined time interval after electrically connecting said ventilating circuit, and means for adjusting said time controlled stop means to vary the length of the time interval of effectiveness of said stop means.

15. A device for controlling a first and a second electrical circuit and successively connecting the same to a source of electrical energy, comprising: switch means mounted electrically to connect said first circuit to the source of electrical energy in one position of said switch means and to connect said second circuit to said source in a second position of said switch means, said switch means having an "off" position; stop means mounted to arrest movement of the switch means at said one position from said "off" position; and time controlled means actuated by an operation of the switch means from the "off" to the one position, said time control means being mounted to move the stop means from arresting condition on the passing of a predetermined time interval thereafter.

CARL J. E. OMERON.

REFERENCES CITED

The following references are of record in the file of this patent:

UNITED STATES PATENTS

| Number | Name | Date |
|---|---|---|
| 1,850,849 | Peoples | Mar. 22, 1932 |
| 1,876,281 | Eiseman | Sept. 6, 1932 |

OTHER REFERENCES

"Yachting," August 1944—page 133.